United States Patent
Nishizawa

(10) Patent No.: US 10,144,261 B2
(45) Date of Patent: Dec. 4, 2018

(54) COIL SPRING

(71) Applicant: NHK SPRING CO., LTD., Yokohama-shi, Kanagawa (JP)

(72) Inventor: Shinichi Nishizawa, Walled Lake, MI (US)

(73) Assignee: NHK SPRING CO., LTD., Yokohama-Shi, Kanagawa (JP)

(*) Notice: Subject to any disclaimer, the term of this patent is extended or adjusted under 35 U.S.C. 154(b) by 0 days.

(21) Appl. No.: 15/421,384

(22) Filed: Jan. 31, 2017

(65) Prior Publication Data

US 2018/0215226 A1  Aug. 2, 2018

(51) Int. Cl.
*B60G 11/14* (2006.01)
*F16F 1/12* (2006.01)

(52) U.S. Cl.
CPC .............. *B60G 11/14* (2013.01); *F16F 1/123* (2013.01); *B60G 2202/312* (2013.01); *B60G 2206/426* (2013.01); *B60G 2206/81035* (2013.01); *F16F 2232/08* (2013.01)

(58) Field of Classification Search
CPC ............ B60G 11/14; F16F 1/10; F16F 1/1213
See application file for complete search history.

(56) References Cited

U.S. PATENT DOCUMENTS

| | | | |
|---|---|---|---|
| 4,903,985 A | 2/1990 | Muhr et al. | |
| 6,543,757 B2 | 4/2003 | Imaizumi | |
| 9,770,957 B2* | 9/2017 | Sano | F16F 1/04 |
| 2002/0089108 A1* | 7/2002 | Imaizumi | B60G 11/14 |
| | | | 267/248 |
| 2007/0120303 A1* | 5/2007 | Rhein | B60G 11/14 |
| | | | 267/286 |
| 2009/0106006 A1* | 4/2009 | Nishizawa | B60G 11/15 |
| | | | 703/8 |
| 2013/0099435 A1* | 4/2013 | Matsuoto | F16F 1/047 |
| | | | 267/166 |
| 2015/0231939 A1* | 8/2015 | Yamamotoya | B60G 3/14 |
| | | | 280/124.153 |

FOREIGN PATENT DOCUMENTS

| | | |
|---|---|---|
| JP | 01156119 A | 6/1989 |
| JP | 2642163 B2 | 8/1997 |
| JP | 2000055096 A | 2/2000 |
| JP | 2000351311 A | 12/2000 |
| JP | 2002178736 A | 6/2002 |
| JP | 2005016645 A | 1/2005 |

OTHER PUBLICATIONS

International Search Report (ISR) and Written Opinion dated Mar. 20, 2018 issued in International Application No. PCT/JP2018/002588.

* cited by examiner

*Primary Examiner* — Vishal R Sahni

(74) *Attorney, Agent, or Firm* — Holtz, Holtz & Volek PC

(57) ABSTRACT

A coil spring according to one embodiment includes a lower end turn portion which is in contact with a lower spring seat, an upper end turn portion which is in contact with an upper spring seat, and an effective portion between the lower end turn portion and the upper end turn portion. The coil spring is cylindrical about an axis of the effective portion in its free shape which is not compressed. Further, with respect to a coordinate system in which a force line is assumed as a Z-axis, the coil spring is cylindrical with a constant pitch in a direction along the Z-axis in its compressed shape which is compressed to a specified height.

5 Claims, 10 Drawing Sheets

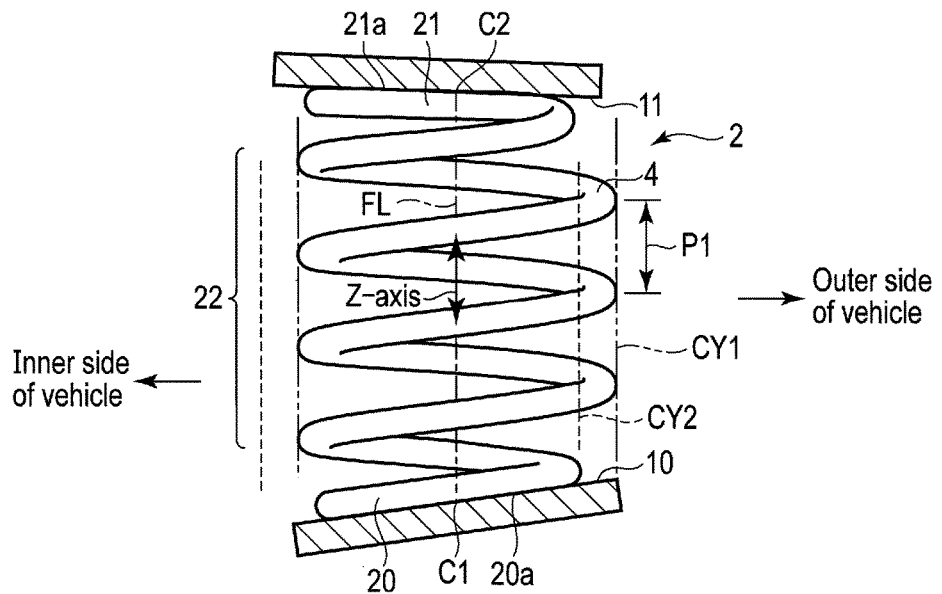
F I G. 2
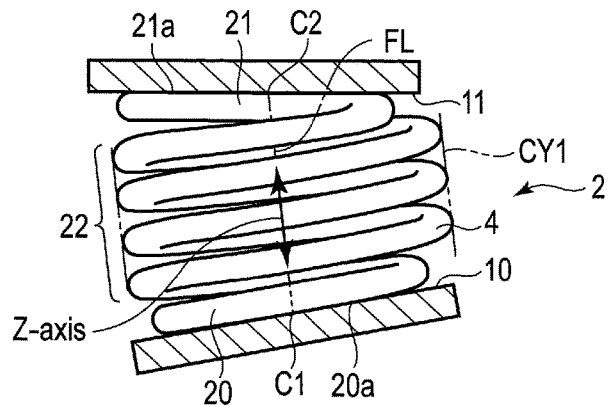
F I G. 3

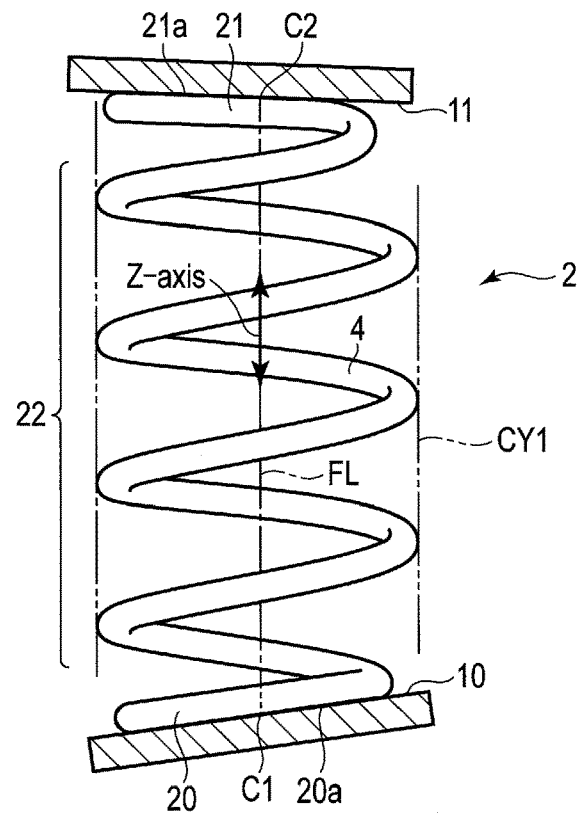
F I G. 4
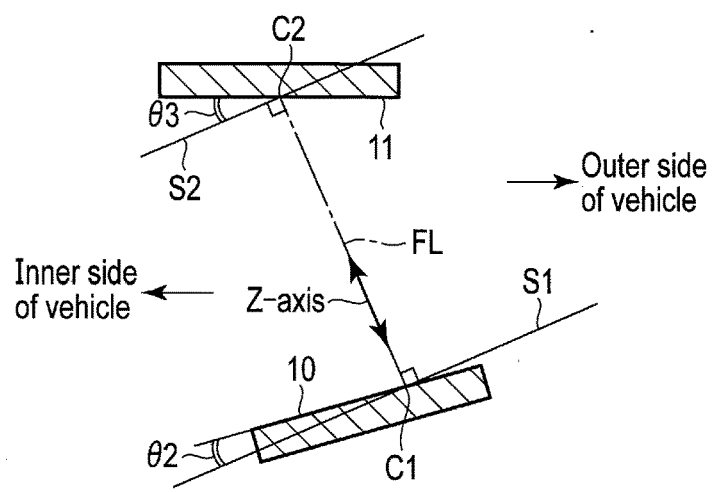
F I G. 5

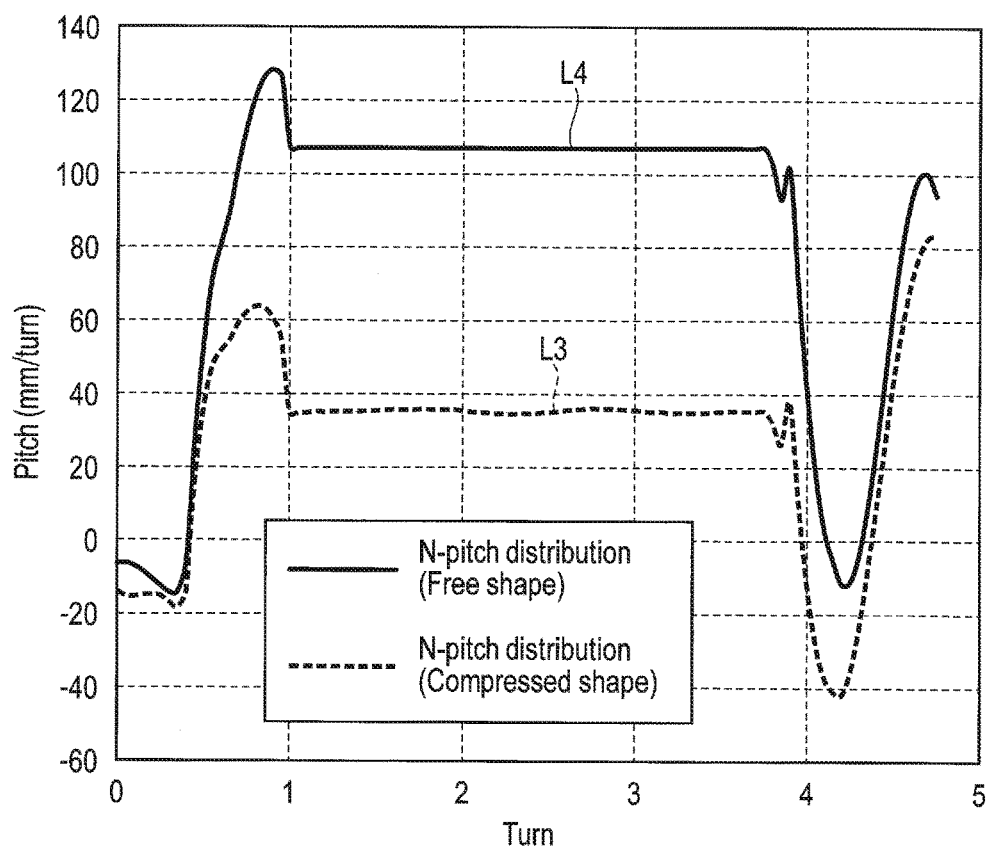
F I G. 7

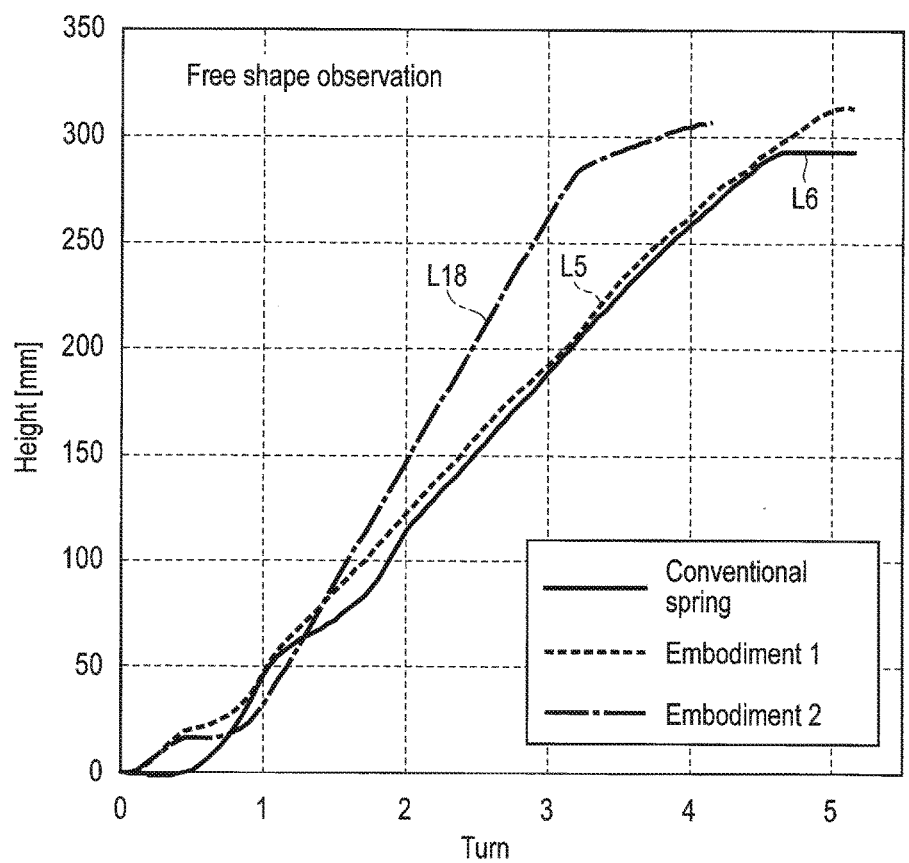
F I G. 8

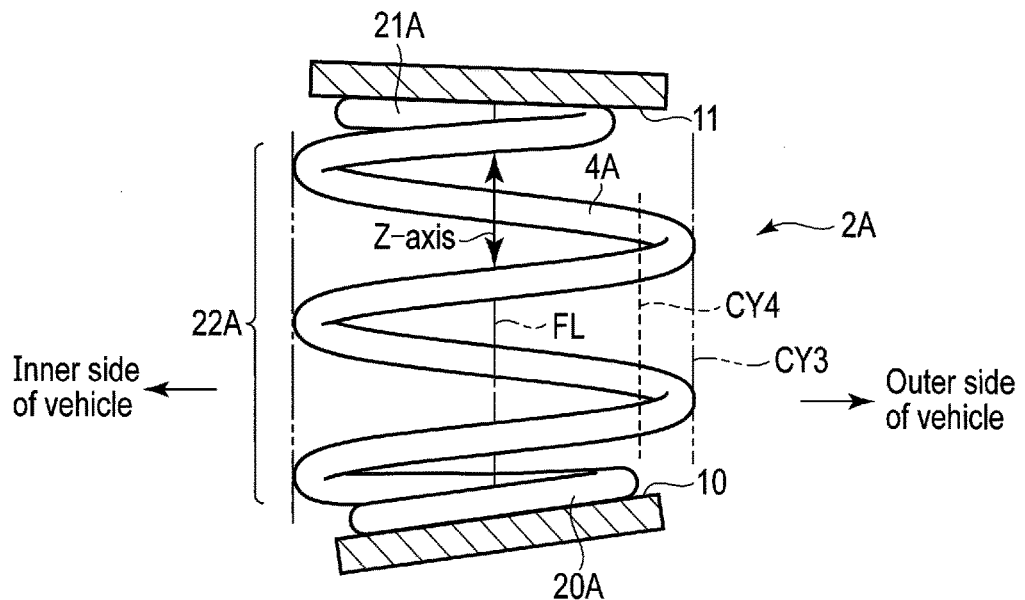
F I G. 10
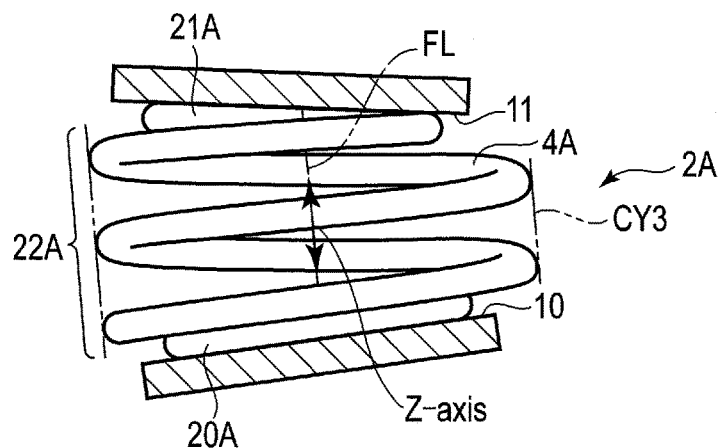
F I G. 11

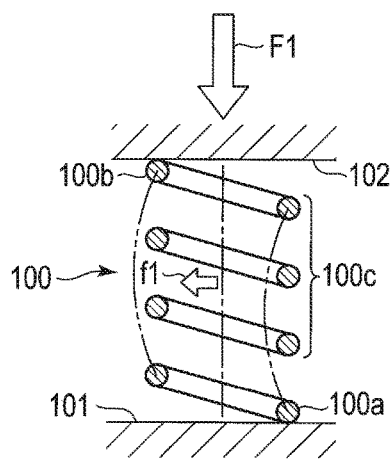
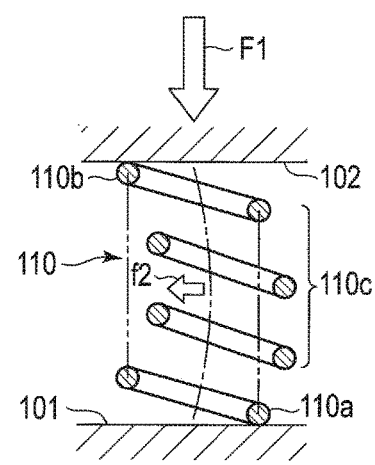
FIG. 13A
(PRIOR ART)
FIG. 13B
(PRIOR ART)

COIL SPRING

BACKGROUND OF THE INVENTION

1. Field of the Invention

The present invention relates to a coil spring which can be used in a suspension of a vehicle, for example.

2. Description of the Related Art

As a method of producing a coil spring, a method of forming the coil spring by hot working and a method of forming the coil spring by cold working are known. The coil spring formed by hot working is formed into a helical shape by winding a wire that is heated to a high temperature (for example, an austenitizing temperature of steel) around a mandrel at a predetermined pitch. The length of the wire is equivalent to that of one coil spring. In this specification, an apparatus which produces a coil spring by hot working is referred to as a hot forming coiling machine, and the coil spring formed by hot working is referred to as a hot formed coil spring. Since the hot forming coiling machine winds a wire which has been softened as a result of heating around the mandrel, it is suitable for producing a coil spring having a relatively large wire diameter.

In contrast, a coil spring formed by cold working is produced in such a way that a wire having a length equivalent to that of multiple coil springs is supplied between a first pin and a second pin of the coiling machine, and the wire is formed to be arc-shaped continuously between the first pin and the second pin. When the wire is formed into one coil spring, the wire is cut by a cutter. In this specification, an apparatus which produces a coil spring by cold working is referred to as a cold forming coiling machine, and the coil spring formed by cold working is referred to as a cold formed coil spring. The cold forming coiling machine can produce a coil spring of a special shape other than a cylindrical shape.

FIG. 13A schematically shows an example of a conventional coil spring 100. A lower end turn portion 100a of the coil spring 100 is supported by a lower spring seat 101. An upper end turn portion 100b of the coil spring 100 is supported by an upper spring seat 102. The positions of the spring seats 101 and 102 are determined in accordance with the specifications of the counterpart components which support the coil spring. Since the wire is wound helically, the coil spring 100 is not symmetric with respect to the center of the coil. Accordingly, when a compressive load F1 is applied to the coil spring 100, it is known that an effective portion 100c is deformed in a direction shown by arrow f1, and that the so-called bowing occurs. The bowing tends to occur particularly in a coil spring having a small number of turns (for example, when the number of turns is five or less). The coil spring 100 having the bowing may interfere with the surrounding components, and thus, such coil spring 100 is not desirable.

In order to prevent the occurrence of bowing, as indicated by another conventional example shown in FIG. 13B, a coil spring 110, which is formed in a C-shape or an S-shape in its free shape not subjected to application of load, has also been proposed. The aim is to make an effective portion 110c straight as the effective portion 110c of the coil spring 110 is deformed in a direction shown by arrow f2 in a state in which the compressive load F1 is applied. JP 1989-156119A or JP 2642163B also discloses a coil spring formed in a C-shape. Since it is sometimes difficult to actually produce a coil spring of such a special shape by a hot forming coiling machine, the cold forming coiling machine is used. However, when a coil spring having a large wire diameter is to be produced by the cold forming coiling machine, particular measures regarding the structure and control of the coiling machine must be taken.

BRIEF SUMMARY OF THE INVENTION

An object of the present invention is to provide a coil spring which can be produced by a hot forming coiling machine, and in which bowing is suppressed.

One embodiment of the present invention relates to a coil spring including a wire formed into a helical shape, and being arranged between a lower spring seat and an upper spring seat, and the coil spring comprises: a lower end turn portion which is in contact with the lower spring seat; an upper end turn portion which is in contact with the upper spring seat; an effective portion between the lower end turn portion and the upper end turn portion; and a force line, which is a straight line, connecting a center of force applied to the lower end turn portion and a center of force applied to the upper end turn portion in a state in which the force which compresses the effective portion is applied to the lower end turn portion and the upper end turn portion. The effective portion is cylindrical about an axis of the effective portion in its free shape which is not compressed. Further, with respect to a coordinate system in which the force line is assumed as a Z-axis, the effective portion is cylindrical with a constant pitch in a direction along the Z-axis in its compressed shape at a specified height. Furthermore, in this coil spring, a center of each of the lower end turn portion and the upper end turn portion should preferably be deviated from a coil center in accordance with a difference between the force line and a center of the lower spring seat and a difference between the force line and a center of the upper spring seat, and inclinations of the lower end turn portion and the upper end turn portion at the specified height should preferably be made to correspond to those of the lower spring seat and the upper spring seat, respectively.

According to the coil spring of the present embodiment, in a state in which the coil spring is compressed to the specified height, the effective portion does not have bowing. Accordingly, in a state in which the coil spring is incorporated into a suspension of a vehicle, for example, the coil spring can be prevented from interfering with the surrounding components. Moreover, the coil spring of the present embodiment can be produced by a hot forming coiling machine. The coil spring can be used in, for example, a link-motion-type suspension, not limited to a strut-type suspension. Also, the coil spring of the present embodiment can be used in an application other than a suspension.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a side view of the coil spring shown in FIG. 1.

FIG. 3 is a side view of the coil spring being compressed to the maximum.

FIG. 4 is a side view of the coil spring being extended to the maximum.

FIG. 5 is an illustration schematically showing a lower spring seat and an upper spring seat of the suspension shown in FIG. 1.

FIG. 7 is a graph showing the relationship between a position of turns from an end of a wire of the coil spring shown in FIG. 2 and a pitch.

FIG. 8 is a graph showing the relationship between a position of turns from an end of the wire of each of the three types of coil springs and a height.

FIG. 10 is a side view of a coil spring according to a second embodiment.

FIG. 11 is a side view of the coil spring shown in FIG. 10 being compressed to the maximum.

FIG. 13A is a cross-sectional view of a conventional coil spring.

FIG. 13B is a cross-sectional view of another conventional coil spring.

DETAILED DESCRIPTION OF THE INVENTION

A coil spring according to one embodiment of the present invention will now be described with reference to FIGS. 1 to 9.

Figure 1:
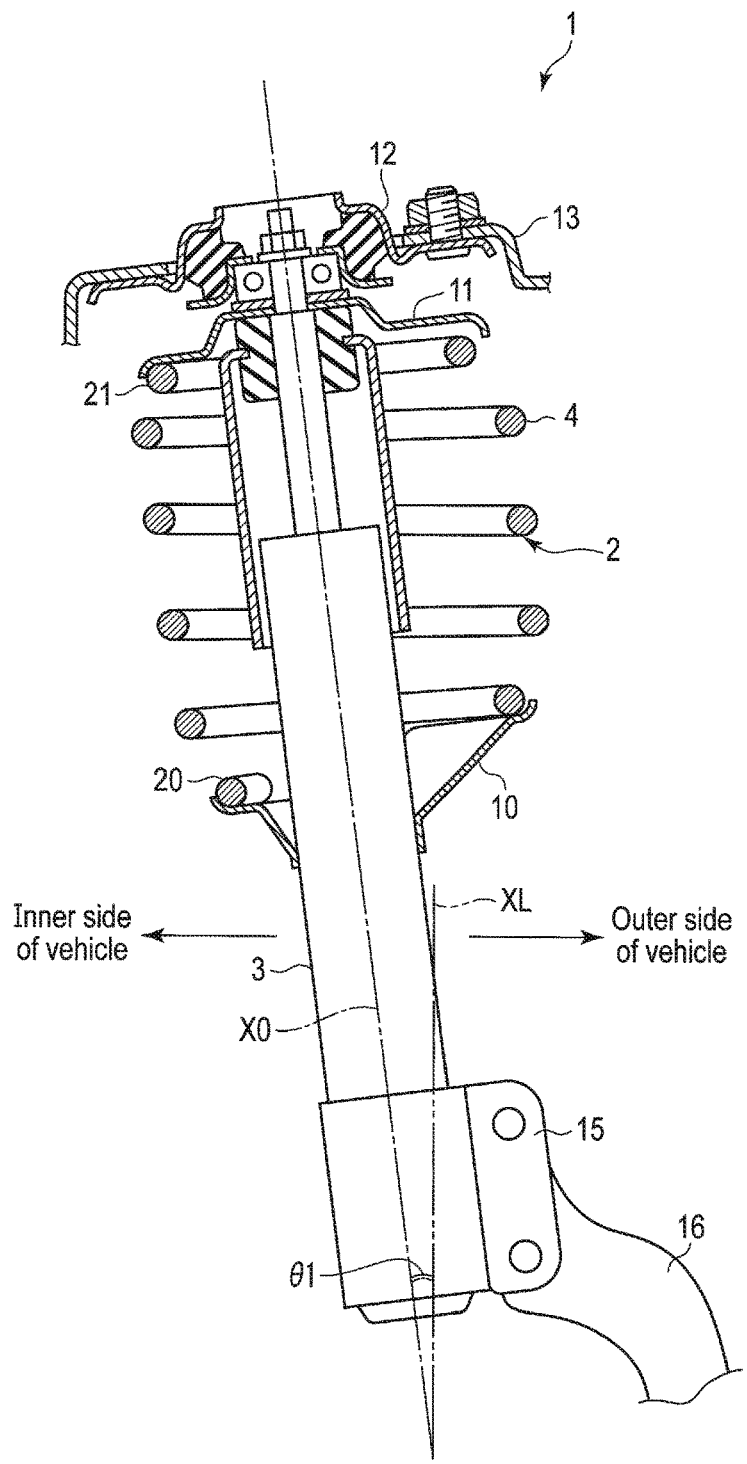
FIG. 1 is a cross-sectional view of a suspension comprising a coil spring according to a first embodiment.

A McPherson-strut-type suspension 1 shown in FIG. 1 comprises a suspension coil spring 2 (hereinafter simply referred to as a coil spring 2), and a strut 3 formed of a shock absorber. The coil spring 2 comprises a wire 4 made of spring steel which is formed into a helical shape. The coil spring 2 is mounted in the suspension 1 in a state in which it is compressed between a lower spring seat 10 and an upper spring seat 11. An upper end of the strut 3 is mounted on a vehicle body 13 via a mount insulator 12. A bracket 15 is provided at the lower part the strut 3. A knuckle member 16 (only a part of which is shown) for supporting an axle is mounted on the bracket 15. The strut 3 is mounted in the vehicle body 13 in such a state that an upper end side of the strut 3 is inclined, more specifically, axis X0 is inclined toward the inner side of the vehicle at an angle of e1 with respect to a vertical line XL of gravity.

The coil spring 2 as shown in FIG. 2 is compressed between the lower spring seat 10 and the upper spring seat 11. FIG. 3 shows the state where the coil spring 2 is compressed to the maximum. FIG. 4 shows the state where the coil spring 2 is extended to the maximum. The coil spring 2 includes a lower end turn portion 20 supported by the lower spring seat 10, an upper end turn portion 21 supported by the upper spring seat 11, and an effective portion 22 between the end turn portions 20 and 21. A lower surface 20a of the lower end turn portion 20 is in contact with the lower spring seat 10. An upper surface 21a of the upper end turn portion 21 is in contact with the upper spring seat 11. The effective portion 22 is a portion where the adjacent winding portions of the wire 4 do not contact each other in a state in which the coil spring 2 is compressed to the maximum, and which functions effectively as a spring. The number of turns of the effective portion 22 is, for example, four. The lower end turn portion 20 refers to a part extending to a point around 0.6 to 0.7 turns, for example, from a lower end of the wire 4. The upper end turn portion 21 refers to a part extending to a point around 0.8 turns, for example, from an upper end of the wire 4. The lower spring seat 10 can move relatively to the upper spring seat 11 in the direction along axis X0 of the strut 3.

In a state in which the coil spring 2 is compressed, the lower spring seat 10 and the end turn portion 20 contact each other and there exists a center of force C1 applied to the end turn portion 20. The center of force C1 is not necessarily the center of the turn (the center of curvature) of the end turn portion 20. That is, the center of force C1 depends on a distribution of force of contact between the spring seat 10 and the end turn portion 20. Since the upper spring seat 11 and the end turn portion 21 contact each other, there exists a center of force C2 applied to the end turn portion 21. In this specification, a line connecting the center of force C1 applied to the lower end turn portion 20 and the center of force C2 applied to the upper end turn portion 21 will be referred to as a force line (load axis) FL. The position of the force line (i.e., the force line position) may be referred to as FLP for short. The force line FL is at a position radially deviated from the center of the turn of the lower end turn portion 20 and the center of the turn of the upper end turn portion 21.

In the coil spring 2 of the present embodiment, the shapes of the end turn portions 20 and 21 and a decentered position of each of the end turn portions 20 and 21 with respect to the center of the curvature are adjusted such that the center of the coil of the effective portion 22 matches the force line FL in the compressed state (compressed shape). That is, the effective portion 22 of the coil spring 2 is cylindrical with a substantially constant coil diameter in which the force line FL is at the center. The meaning of "substantially constant" in the above description is that when the cylindrical effective portion 22 is formed by winding the wire 4 around a mandrel of a hot forming coiling machine, the forming error within the range of tolerance and the variations of the shapes due to springback are of a negligible level. A pitch P1 (FIG. 2) of the effective portion 22 is substantially constant in a coordinate system in which the force line FL is assumed as the Z-axis. Accordingly, the coil spring 2 is compressed equally about the force line FL in response to a compressive load acting in the direction along the Z-axis.

A two-dot chain line CY1 shown in FIGS. 2 to 4 represents the position of the outer circumference of the effective portion 22. A broken line CY2 in FIG. 2 represents the position of the outer circumference of an effective portion of a conventional coil spring. The effective portion of the conventional coil spring is located more toward the inner side of a vehicle as compared to the effective portion 22 of the present embodiment. There is no difference in the positions of the spring seats 10 and 11 between the conventional spring and the present embodiment.

When a Z-axial compressive load is applied to the coil spring 2, the effective portion 22 is compressed between the lower spring seat 10 and the upper spring seat 11. The coil spring 2 of the present embodiment does not yield bowing whether in its free shape which is not compressed or its compressed shape. In the free shape, the effective portion 22 is cylindrical about the axis. In the coordinate system in which the force line FL is assumed as the Z-axis, the effective portion 22 in its compressed shape which is compressed to a specified height is cylindrical with a constant pitch in the direction along the Z-axis (force line FL).

As compared to the free shape, the effective portion 22 in the compressed shape has its coil diameter equally increased all around the turn about the force line FL. That is, when the coil spring 2 is compressed, the coil spring 2 is equally enlarged about the force line FL. The enlarged coil spring 2 is less likely to interfere with the surrounding components than a coil spring having bowing.

As shown in FIG. 5, the lower spring seat 10 is inclined at an angle θ2 with respect to a line segment S1 perpendicular to the force line FL. The upper spring seat 11 is inclined at an angle θ3 with respect to a line segment S2 perpendicular to the force line FL. That is, the lower spring seat 10 and the upper spring seat 11 are not parallel to each other. Further, the force line FL is inclined obliquely at angles θ2 and θ3 with respect to the lower spring seat 10 and the upper spring seat 11.

An amount of deviation of the force line FL from the center of the end turn portion at a spring height (specified height) at which bowing should not occur is given as a decentering quantity of each of the lower spring seat 10 and the upper spring seat 11. Further, angles θ2 and θ3 are given as bearing surface angles of the lower spring seat 10 and the upper spring seat 11, respectively. However, the direction of bowing of the coil spring may be deviated from the direction of inclination of the spring seats 10 and 11. In that case, the orientation and the angle of the bearing surface of each of the spring seats 10 and 11 need to be slightly corrected by tilting the bearing surface in the direction of canceling the bowing.

For example, in the coil spring 2 of the present embodiment, the center of each of the lower end turn portion 20 and the upper end turn portion 21 is deviated from the coil center in accordance with a difference between the force line FL and the center of the lower spring seat 10, and a difference between the force line FL and the center of the upper spring seat 11. Also, the inclinations of the lower end turn portion 20 and the upper end turn portion 21 at the specified height are made to correspond to those of the lower spring seat 10 and the upper spring seat 11, respectively.

Figure 6:
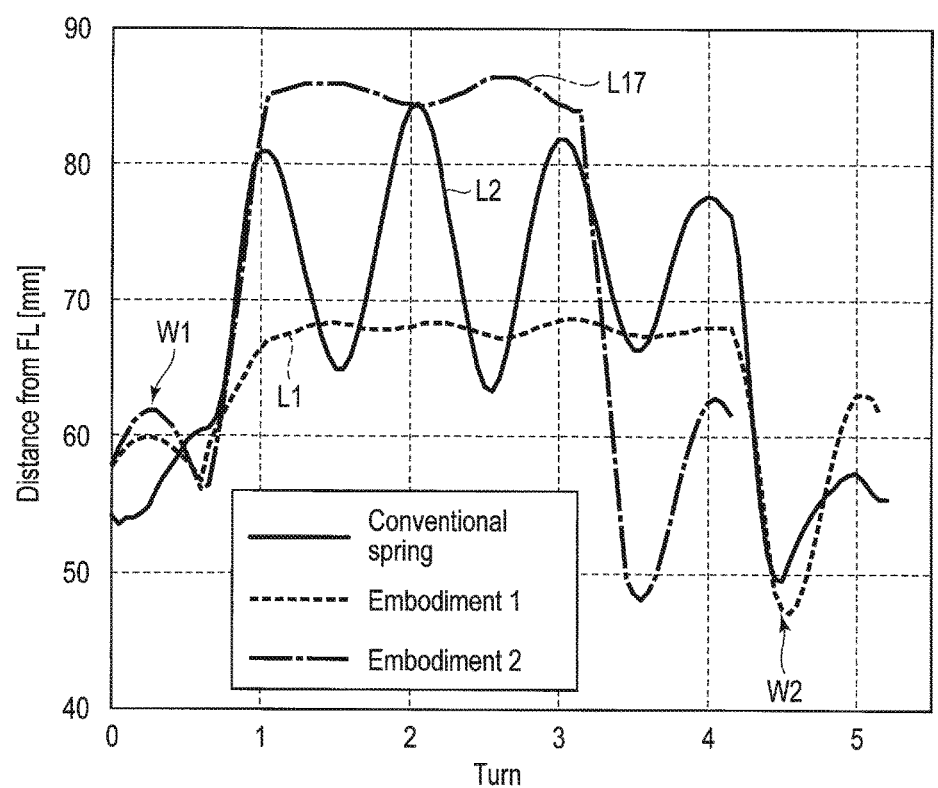
FIG. 6 is a graph showing the relationship between a position of turns from an end of a wire of each of three types of coil springs and a distance from a force line.

Line L1 in FIG. 6 shows the relationship between a position of turns from an end of the wire 4 of the coil spring 2 and a distance from the force line FL of the same. As shown by line L1 in FIG. 6, in the effective portion, a distance from the force line FL to the wire is substantially constant about the force line FL. In one example of the lower end turn portion, as shown by W1, the lower end turn portion is expressed in a wave form representing that the distance from the force line FL is first increased and then reduced from the lower end of the wire toward the effective portion. In one example of the upper end turn portion, as shown by W2, the upper end turn portion is expressed in a wave form representing that the distance from the force line FL is first reduced and then increased from the upper end of the wire toward the effective portion. Line L2 in FIG. 6 shows the relationship between a position of turns from an end of a wire of a conventional coil spring (having four turns) and a distance from the force line FL. In the conventional coil spring, a distance from the force line FL to the wire is greatly varied about the force line FL.

Line L3 in FIG. 7 shows the relationship between a position of turns from an end of the wire and a pitch in the state in which the coil spring 2 is compressed (i.e., in the compressed shape). Line L4 in FIG. 7 shows the relationship between a position of turns from an end of the wire and a pitch in the free shape in which the coil spring 2 is not compressed. In the compressed shaped, the pitch of the effective portion is substantially constant with respect to the direction along the force line FL (Z-axis direction). In the free shape in which no load is applied, the pitch of the effective portion is substantially constant with respect to the center of the coil of the effective portion.

Line L5 in FIG. 8 shows the relationship between a position of turns from an end of the wire when the coil spring 2 is in its free shape and a height of the same. As shown by line L5 in FIG. 8, the height of the effective portion is increased gradually in accordance with the position of turns from the end. In one example of the lower end turn portion, the lower end turn portion is expressed in a form that the height is first greatly increased and then the increase is reduced (i.e., undulated like a wave) from the lower end of the wire toward the effective portion. In one example of the upper end turn portion, the height is increased toward the upper end of the wire. In contrast, in one example of the conventional coil spring, as shown by line L6 in FIG. 8, the height of the lower end turn portion and the height of the upper end turn portion almost do not change, and thus these parts are indicated as a flat line.

Figure 9:
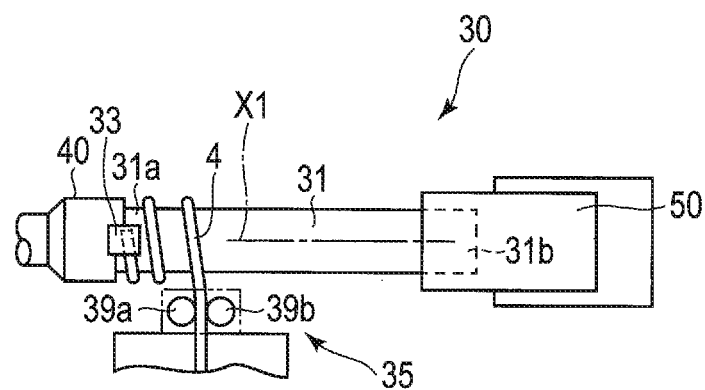
FIG. 9 is a plan view of a part of a hot forming coiling machine.

FIG. 9 shows a part of a hot forming coiling machine 30 for producing a coil spring. The coiling machine 30 includes a columnar mandrel 31, a chuck 33, and a guide portion 35. An end portion 31a on one side of the mandrel 31 has a shape corresponding to the end turn portion on one end (the winding start side) of the coil spring. The guide portion 35 includes guide members 39a and 39b.

The wire 4 formed of spring steel is cut in a length equivalent to a length of one coil spring in advance. The wire 4 is heated to an austenitizing temperature (i.e., higher than A3 transformation point and lower than 1150° C.), and supplied to the mandrel 31 by a feed mechanism. The chuck 33 fixes a distal end of the wire 4 to the mandrel 31. The guide portion 35 controls the position of the wire 4 wound around the mandrel 31. The end portion 31a on one side of the mandrel 31 is held by a mandrel drive head 40. The mandrel 31 rotates about axis X1 by the mandrel drive head 40. An end portion 31b on the other side of the mandrel 31 is rotatably supported by a mandrel holder 50. The guide portion 35 moves in the direction along axis X1 of the mandrel 31, and guides the wire 4 in accordance with a pitch angle of the coil spring to be formed.

The wire 4 has a length equivalent to a length of one coil spring. The wire 4 is heated to a temperature suitable for hot forming by a furnace. A distal end of the heated wire 4 is fixed to the mandrel 31 by the chuck 33. In addition to rotation of the mandrel 31, the guide portion 35 moves in the direction along axis X1 of the mandrel 31 in synchronization with the rotation of the mandrel 31. The wire 4 is thereby wound around the mandrel 31 at a predetermined pitch. The above explanation applies to a case of producing a coil spring by the hot forming coiling machine 30. The coil spring of the present embodiment can also be produced by a cold forming coiling machine.

Figure 12:
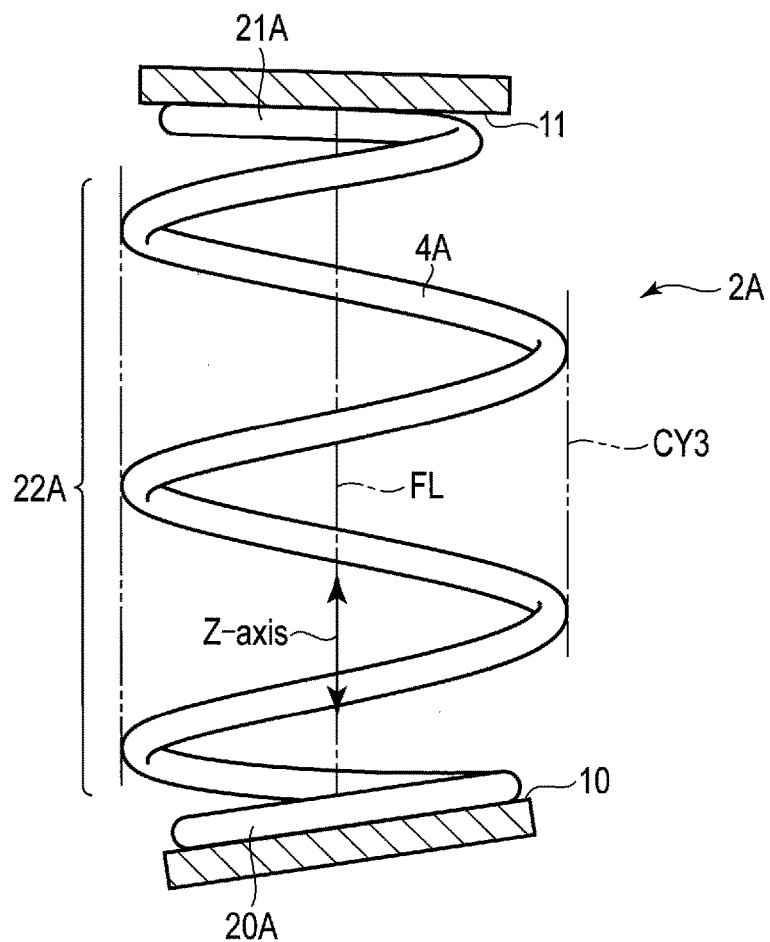
FIG. 12 is a side view of the coil spring shown in FIG. 10 being extended to the maximum.

FIG. 10 shows a coil spring 2A according to a second embodiment. FIG. 11 is a side view of the coil spring 2A being compressed to the maximum. FIG. 12 is a side view of the coil spring 2A being extended to the maximum. Likewise the coil spring 2 of the first embodiment, the coil spring 2A includes a lower end turn portion 20A supported by a lower spring seat 10, an upper end turn portion 21A supported by an upper spring seat 11, and an effective portion 22A between the end turn portions 20A and 21A.

The number of turns of the effective portion 22A is three. A coil diameter of the effective portion 22A is greater than that of the effective portion 22 of the first embodiment. As in the case of the effective portion 22 of the first embodiment, the effective portion 22A has a shape (a cylindrical shape) not having bowing about a force line FL whether in its free shape or in its compressed shape. That is, the effective portion 22A is cylindrical about an axis of the effective portion 22A in its free shape which is not compressed. Further, in a coordinate system in which the force line FL is assumed as the Z-axis, the effective portion 22A in its compressed shape which is compressed to a specified height is cylindrical with a constant pitch in the direction along the Z-axis (force line FL).

A diameter of a wire 4A of the second embodiment is less than a diameter of the wire 4 of the first embodiment. A two-dot chain line CY3 shown in FIGS. 10 to 12 represents the position of the outer circumference of the effective portion 22A. A broken line CY4 in FIG. 10 represents the position of the outer circumference of an effective portion of a conventional coil spring. The effective portion of the conventional coil spring is located more toward the inner side of a vehicle as compared to the effective portion 22A of the present embodiment. There is no difference in the positions of the spring seats 10 and 11 between the conventional spring and the present embodiment.

Line L17 in FIG. 6 shows the relationship between a position of turns from an end of the wire of the coil spring 2A of the second embodiment and a distance from the force line FL of the same. As shown by line L17 in FIG. 6, in the effective portion, a distance from the force line FL to the wire is substantially constant about the force line FL. As shown by W1, the lower end turn portion is expressed in a wave form representing that the distance from the force line FL is first increased and then reduced from a lower end of the wire toward the effective portion. As shown by W2, the upper end turn portion is expressed in a wave form representing that the distance from the force line FL is first reduced and then increased from an upper end of the wire toward the effective portion.

Line L18 in FIG. 8 shows the relationship between a position of turns from an end of the wire when the coil spring 2A of the second embodiment is in the free shape and a height of the same. As shown by line L18 in FIG. 8, the height of the effective portion is increased gradually in accordance with the position of turns from the end. The lower end turn portion is expressed in a form that the height is first increased and then decreased (i.e., undulated like a wave) from the lower end of the wire toward the effective portion. In the upper end turn portion, the height is increased toward the upper end of the wire.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring including a wire formed into a helical shape, and being arranged in such a state that it is compressed between a lower spring seat and an upper spring seat of a strut-type suspension, wherein the upper spring seat is not parallel to the lower spring seat, the coil spring comprising:
   a lower end turn portion which is in contact with the lower spring seat;
   an upper end turn portion which is in contact with the upper spring seat;
   an effective portion between the lower end turn portion and the upper end turn portion; and
   a force line, which is a straight line, connecting a center of force applied to the lower end turn portion and a center of force applied to the upper end turn portion in a state in which the force which compresses the effective portion is applied to the lower end turn portion and the upper end turn portion,
   wherein:
   the force line is inclined obliquely at angles with respect to the lower spring seat and the upper spring seat,
   the effective portion is cylindrical about an axis of the effective portion with a substantially constant pitch along the axis in its free shape which is not compressed, the free shape being exhibited in an unassembled state in which the coil spring is not arranged between the lower spring seat and the upper spring seat of the strut-type suspension, and
   with respect to a coordinate system in which the force line is assumed as a Z-axis, the effective portion is cylindrical with a substantially constant pitch and a substantially constant coil diameter in a direction along the Z-axis in its compressed shape which is compressed to a specified height between the lower spring seat and the upper spring seat which is not parallel to the lower spring seat.

2. The coil spring of claim 1, wherein
   a center of each of the lower end turn portion and the upper end turn portion is deviated from a coil center in accordance with a difference between the force line and a center of the lower spring seat and a difference between the force line and a center of the upper spring seat, and
   inclinations of the lower end turn portion and the upper end turn portion at the specified height are made to correspond to those of the lower spring seat and the upper spring seat, respectively.

3. The coil spring of claim 1, wherein a coil diameter of the effective portion in the compressed shape is increased equally all around a turn about the force line as compared to a coil diameter of the effective portion in the free shape.

4. A strut-type suspension comprising:
   a strut;
   a lower spring seat;
   an upper spring seat; and
   a coil spring according to claim 1 which is compressed between the lower spring seat and the upper spring seat.

5. The suspension of claim 4, wherein the lower spring seat is inclined at a first angle with respect to a line segment perpendicular to the force line, and the upper spring seat is inclined at a second angle with respect to a line segment perpendicular to the force line.

* * * * *